May 18, 1954 S. DARLINGTON 2,678,997

PULSE TRANSMISSION

Filed Dec. 31, 1949 4 Sheets-Sheet 1

INVENTOR
S. DARLINGTON
BY N. S. Ewing
ATTORNEY

INVENTOR
S. DARLINGTON
BY
N. D. Ewing
ATTORNEY

INVENTOR
S. DARLINGTON
BY N. S. Ewing
ATTORNEY

INVENTOR
S. DARLINGTON
BY N. S. Ewing
ATTORNEY

Patented May 18, 1954 2,678,997

UNITED STATES PATENT OFFICE 2,678,997

PULSE TRANSMISSION

Sidney Darlington, Summit, N. J., assignor to Bell Telephone Laboratories, Incorporated, New York, N. Y., a corporation of New York Application December 31, 1949, Serial No. 136,289

18 Claims. (Cl. 250—6)

This invention relates primarily to methods and systems for the transmission of pulses of carrier frequency alternating current and one of its principal objects is to control the length and amplitude of such pulses.

Another and more particular object of the invention is to overcome peak power limitations of alternating current or carrier frequency pulse transmitters.

A related object is to increase the output of an alternating-current pulse amplifier over its usual peak power limitations.

A further object is to increase the output power available from a pulse modulation system without encountering the difficulties involved in parallel operation of radio frequency oscillators and amplifiers.

Another object is to compensate for dispersive effects inherent in a transmission system over which short carrier frequency pulses may be sent.

Still another object is to enable pulses of alternating current to be transmitted over an attenuative system with reduced attenuation.

The invention is characterized by the frequency modulating of pulses of alternating current and it makes use of the dispersion to which such frequency modulated-pulses may be subjected to control such pulse parameters as length and amplitude.

In accordance with the present invention, the lengths of alternating current or carrier frequency pulses are changed after the pulses have been generated. The change in length is accomplished by frequency modulating the carrier in a predetermined manner during each pulse, and then passing the frequency-modulated pulse through a dispersive circuit, which is a circuit having such characteristics that the transmission time for an applied signal varies with its frequency.

Existing communications systems using pulsed carrier frequencies use a carrier the frequency of which is fixed during each pulse. The present invention contemplates the use of a frequency-modulated carrier, the frequency of which is shifted, or swept, in the same way during each successive pulse. A preferred system calls for a frequency which varies linearly with time during each pulse. Linearity, however, is not required, so long as the variation during the life of each pulse is, for example, all in one direction, the same for each pulse, and properly taken into account in the design of the dispersive circuit.

When one of the frequency-modulated pulses is passed through a dispersive network such that the amount of phase delay imposed by the network varies over the range of frequencies covered by the carrier, different portions of the pulse, being at different carrier frequencies, are delayed by different amounts. The result is a change in the length of the pulse. If the envelope delay decreases dring the life of the pulse, a shortening results, for the trailing end tends to overtake the leading end.

If the envelope delay decreases one pulse length during the life of the pulse, the above argument indicates a received pulse of zero length, for the trailing end exactly catches up with the leading end. Actually, delay arguments are not rigorous when rates of change are great, and the shrinking of the pulse length is not so spectacular. However, a substantial and calculable shortening is actually obtained, and such a decrease in envelope delay during the life of each pulse is at least close to optimum, from the standpoint of pulse shortening.

An important effect of the pulse shortening is an increase in peak power resulting from the conservation of energy. If the whole pulse arrives in less time, the energy must arrive at a greater rate. If, for example, a four-microsecond pulse is shrunk to one microsecond, the power increase is four to one. The increase in peak voltage, assuming the circuit impedance to be the same at both ends of the delay circuit, would be two to one in the same example.

The principles underlying the present invention may be applied wherever advantages are to be gained by first generating an alternating-current pulse, and thereafter changing its length, with a corresponding change in amplitude. In some applications the change in length is of prime interest. In others, it is the change in amplitude or peak power. An important application is in the frequency modulation of pulses which are to suffer unavoidable distortion as, for example, in a wave guide, the object being to avoid the pulse lengthening or the attenuation which a fixed frequency pulse would suffer due to the distortion.

A more thorough understanding of the invention will be obtained through a study of the following detailed description of the invention as employed in a number of practical pulse transmission systems. In the drawings:

Fig. 1 represents an application of the pulse shortening and peaking techniques of the present invention to a radar system;

Figs. 1A, 1B, 1C, and 1D illustrate the general nature of pulses appearing at various points in the radar system shown in Fig. 1;

Fig. 2 shows a low-frequency delay network for comparison with one of the elements shown in Fig. 1;

Figs. 3A, 3B, 3C, and 3D illustrate the general nature of pulses appearing at various points in a pulse code modulation system utilizing the present invention's pulse shortening and peaking techniques;

Figure 3A:
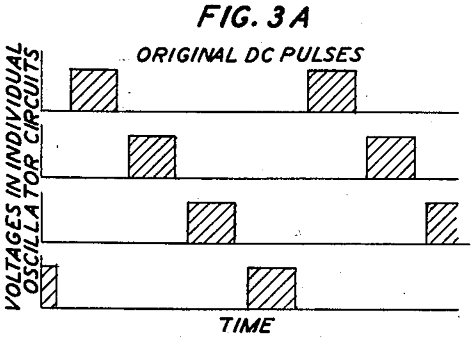
Fig. 3 shows a system operating to produce pulses of the type pictured in Figs. 3A, 3B, 3C, and 3D.
Figure 3C:
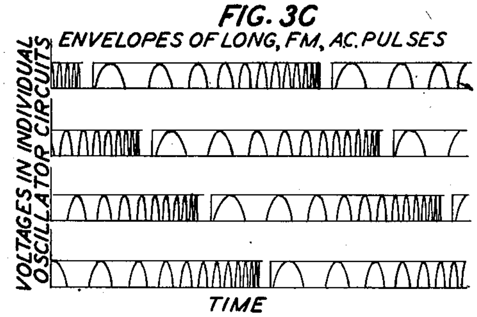
Figure 3D:
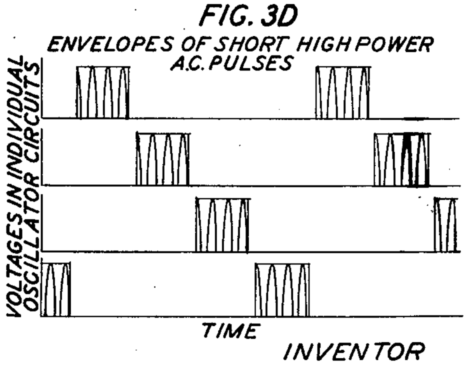
Figure 3B:
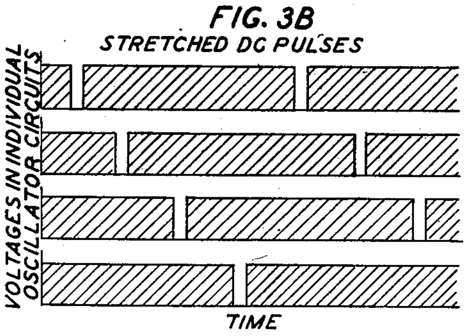
Figure 3:
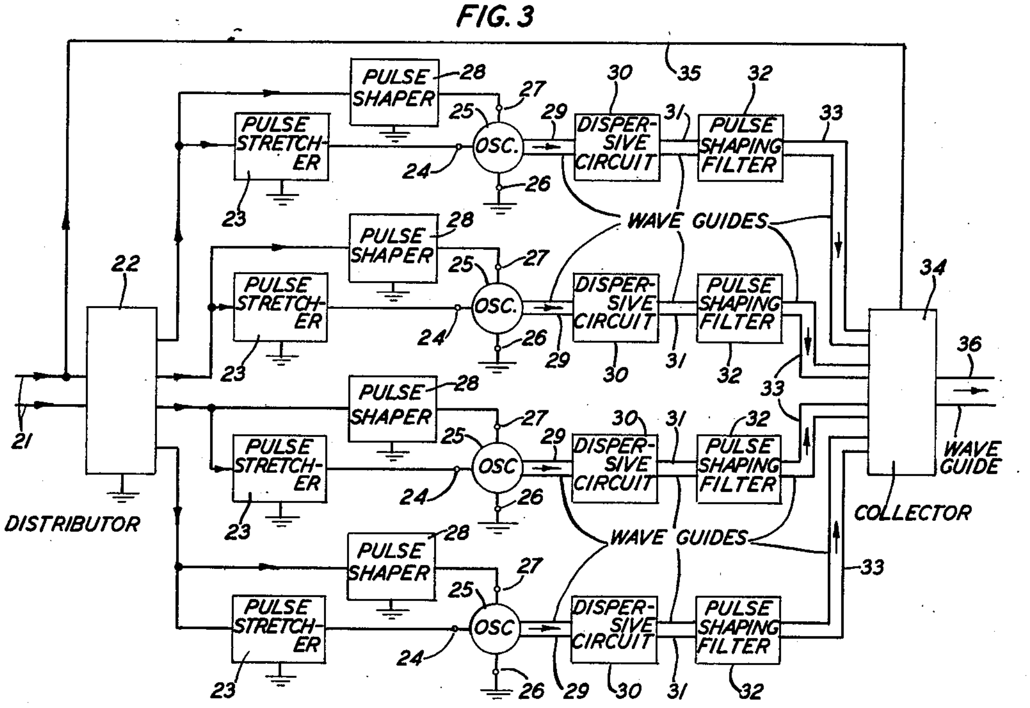
Figure 5:
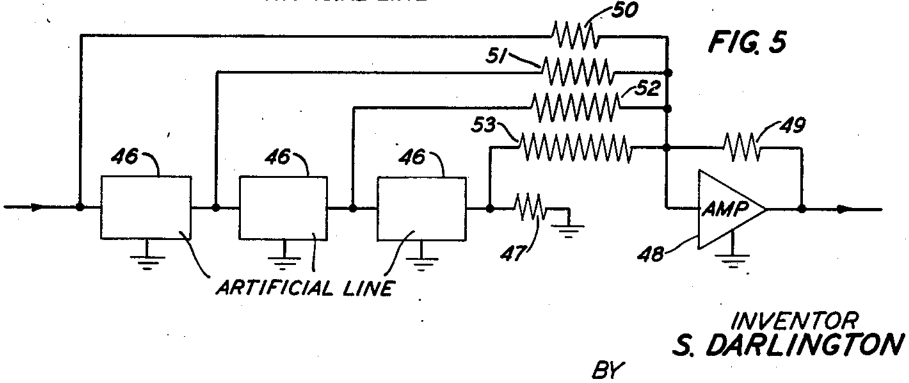
Fig. 5 represents a pulse shaper suitable for use in supplying a varying voltage to the frequency controlling electrodes of the oscillators of Fig. 3.
Figure 5A:
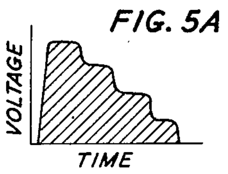
Figure 5B:
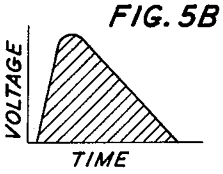
Figure 5C:
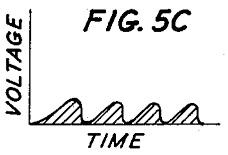
Figure 6:
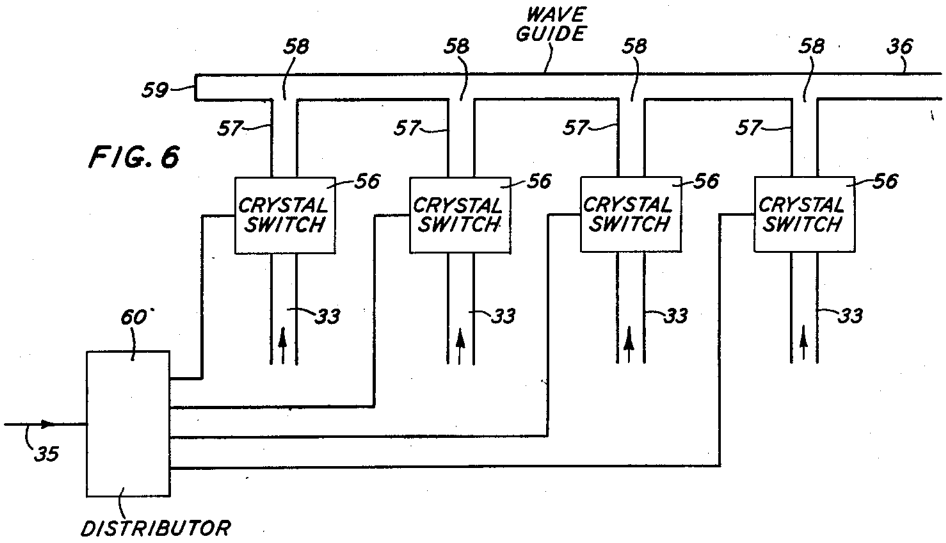
Figure 7:
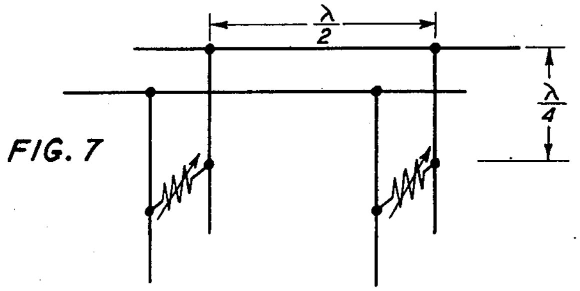
Figure 8:
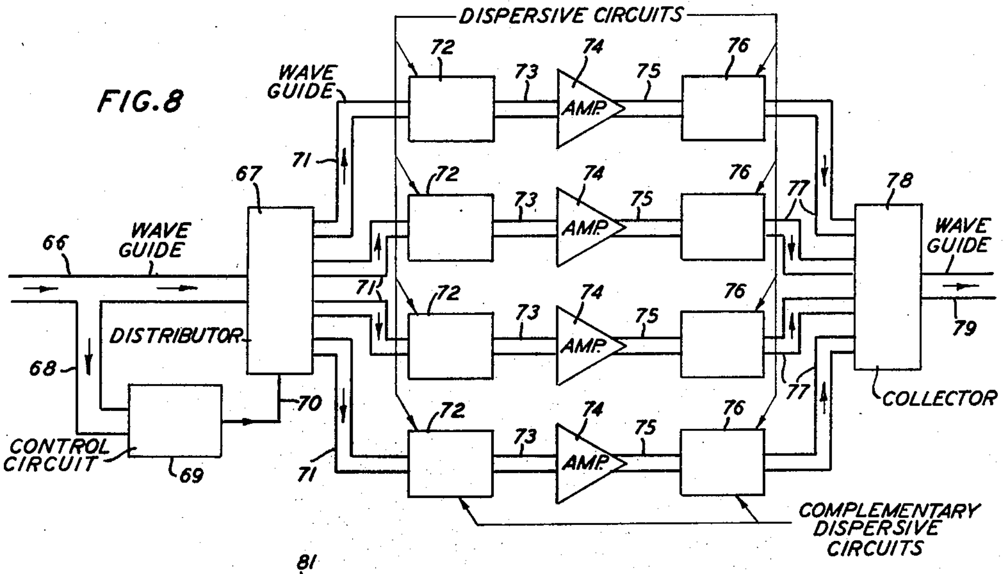
Figure 9:
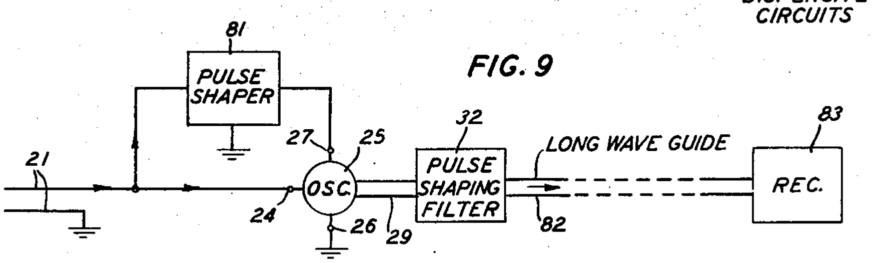
Figure 10:
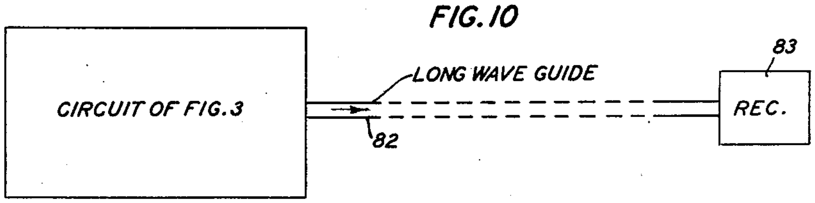

Figs. 5A, 5B, and 5C illustrate direct-current pulse shapes produced by the Fig. 5 circuit;

Fig. 6 shows an alternating-current pulse collection circuit suitable for use as a component of the Fig. 3 system;

Fig. 7 shows a low-frequency transmission line equivalent of part of the Fig. 6 circuit;

Fig. 8 pictures a pulse amplitude modulation system employing the pulse shortening and peaking techniques of the present invention; and Figs. 9 and 10 illustrate systems using the dispersion inherent in a long wave guide to produce pulse shortening in accordance with the invention.

The embodiment of the present invention in a pulse-echo or radar system will be described first, as it may afford an introduction to more complicated communication systems embodying the invention.

When an attempt is made to increase the power of a high power radar transmitter, two kinds of limitations are encountered. One depends on the average power, averaged over the intervals between pulses as well as over the pulses themselves. Limitations of this kind are determined primarily by effects of overheating. The other limitation depends on the peak power generated during each pulse. Limitations of this kind are due to such effects as breakdown caused by excessive voltage.

Pulse shortening techniques in accordance with the present invention apply when the peak power is the effective limit. In such case, each pulse is generated at increased pulse length and decreased peak power with a frequency-modulated carrier. After generation and before they are delivered to the antenna, the pulses are shortened, with a consequent increase in peak power, by means of a dispersive circuit, the latter being, for example, of a wave-guide and cavity type. In radar terms, the pulses are generated at reduced "duty cycle," so that peak power is reduced, and then the "duty cycle" is increased as the pulses pass from the pulse-generating oscillator to the antenna. The dispersion tends to reduce the frequency modulation, and if it is at least close to the optimum, from the pulse shortening standpoint, it will substantially eliminate the frequency modulation, leaving a normal type of radiated pulse with a substantially constant carrier frequency.

Figure 1:
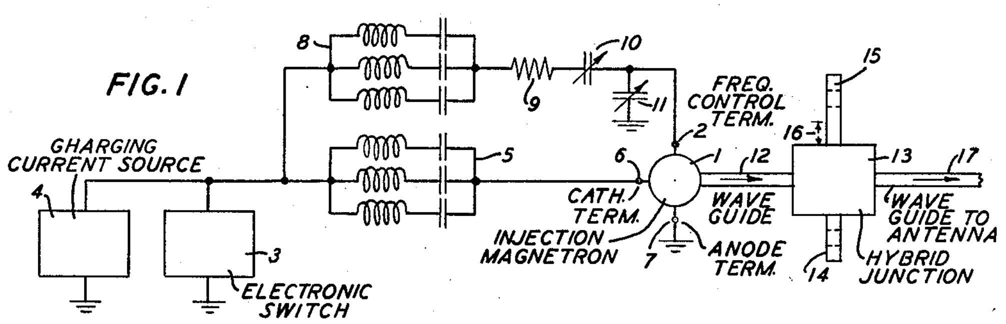

An example of a practical circuit is indicated in Fig. 1. The oscillator tube 1 is a so-called "injection magnetron." It differs from the magnetrons of the better-known radars of World War II in that it has an additional electrode for the express purpose of controlling the frequency of oscillation. A magnetron of this type is disclosed in the application of A. M. Clogston, Serial No. 55,681, filed October 21, 1948 (United States Pat. No. 2,530,948, issued November 21, 1950).

The modulator circuit of the usual radar is here modified by the addition of a circuit to supply a suitable voltage to the frequency controlling terminal 2 of the magnetron 1. The frequency of oscillation varies when the voltage on terminal 2 varies. Therefore, terminal 2 is supplied with a voltage that varies during the life of each pulse in such a way as to give the desired frequency modulation.

In Fig. 1, an electronic switch 3, which may be, for example, a thyratron, a spark gap, or a magnetic coil switch, is connected across a charging current source 4, as in the usual radar modulator. One side of switch 3 and current source 4 is grounded and the other side is connected through a pulse forming network 5 to the magnetron cathode terminal 6. The magnetron anode terminal 7 is grounded.

Figure 1A:
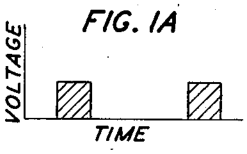

Pulse forming network 5, which is of a well-known type, is composed of several parallel branches, each branch comprising an inductance in series with a capacitance. The several branches are resonant at different frequencies and the network simulates the impedance of an open-circuited transmission line. Network 5 serves to supply flat-topped current pulses to magnetron cathode terminal 6. Since network 5 operates into a resistance load, appearing between cathode terminal 6 and ground, the voltage pulses supplied to cathode terminal 6 are flat-topped. Examples of the direct voltage pulses supplied to magnetron cathode 6 are shown in Fig. 1A.

The circuit which supplies voltage to the frequency controlling terminal 2 is somewhat similar to that which feeds the cathode terminal 6, except that the circuit elements do not have to supply comparable power, and are also modified to give a sloping or varying voltage to the terminal 2 instead of a flat-topped pulse. One side of a pulse forming network 8 is connected to the ungrounded side of switch 3 and current source 4. A resistance 9 is connected to the other side of network 8 and a capacitance 10 is connected between resistance 9 and frequency controlling terminal 2. An additional capacitance 11 is connected between terminal 2 and ground.

Figure 1B:
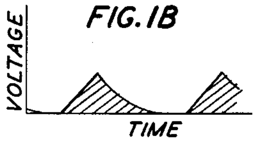

Network 8 is similar to network 5, and comprises a number of parallel series resonant branches, each branch resonant at a different frequency. The elements of network 8, however, are so chosen that network 8 plus capacities 10 and 11 in series form a network equivalent of line simulator 5. The equivalent line length and image impedance may be different than for network 5. Resistor 9 is so chosen as to match the image impedance of the line equivalent of network 8 plus capacities 10 and 11 in series. Network 8 operates into a capacitance load, represented by capacity 11, and the voltage pulses supplied to terminal 2 are sloping, with the voltage of each pulse increasing with time. Examples of the direct voltage pulses supplied to frequency controlling terminal 2 are shown in Fig. 1B.

Figure 1C:
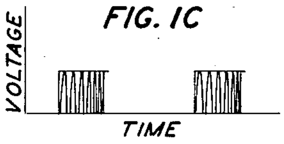

When activated by the described control pulses, magnetron 1 generates pulses of alternating current, the carrier frequency of each pulse increasing with time. In effect, the carrier current of each pulse is frequency modulated. Examples of the type of alternating-current pulses generated by magnetron 1 are shown in Fig. 1C. The pulses illustrated are rectangular but are so shown only for simplicity. In general, other pulse shapes are used.

The magnetron output connection 12, which may be, for example, a wave guide, is connected to one side of a hybrid junction 13. Junction 13 may, for example, take the form of a "hybrid T," such as is disclosed in the application of H. T. Friis, W. D. Lewis and L. C. Tillotson, Serial No.

789,850, filed December 5, 1947 (United States Pat. No. 2,575,804, issued November 20, 1951), and in the article by W. D. Lewis and L. C. Tillotson entitled "A Non-reflecting Branching Filter for Microwaves," appearing in the Bell System Technical Journal, vol. 27, No. 1, page 83, January, 1948. As an alternative, junction 13 may be a "hybrid ring" of the type disclosed in the paper by H. T. Budenbom entitled "Analysis and Performance of Waveguide-Hybrid Rings for Microwaves," appearing in the Bell System Technical Journal, vol. 27, No. 3, pages 473, July, 1948.

Figure 2:
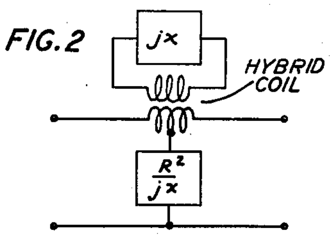

Two opposite branches of the hybrid junction 13 are connected to the equivalents of inverse reactive impedances. The result is a wave guide equivalent of a type of constant resistance delay network commonly used at lower frequencies and shown in Fig. 2. In such a network the group velocity of wave transmission increases with frequency.

The reactive impedances can, for example, take the form of wave guides 14 and 15 with internal iris type barriers, the wave guides 14 and 15 each being closed at the far end so that reactive impedances will be obtained. Wave guides 14 and 15 are connected to a first pair of "complementary" or "conjugate" openings of hybrid junction 13. Barriers such as irises are spaced at intervals within wave guides 14 and 15. These reactive impedances can be designed by combining existing technique for designing wave-guide filters, as disclosed in the application of W. D. Lewis, Serial No. 789,985, filed December 5, 1947 (United States Pat. No. 2,531,447, issued November 28, 1950), with the potential analogue method of designing delay equalizers, as disclosed in H. W. Bode Patent 2,342,638, dated February 29, 1944. Wave guides 14 and 15 are the same except for an additional quarter wavelength of wave guide, indicated by dimension 16, which is added to the junction end of wave guide 15. Thus wave guide 15 and wave guide 14 function as inverse reactive impedances. The network comprising hybrid junction 13 and wave guides 14 and 15 is designed to produce a delay which varies more or less linearly across the band of frequencies swept by the carrier of the frequency-modulated pulses.

An output wave guide 17 is connected to hybrid junction 13 to carry output pulses to an antenna. Wave guides 12 and 17 are connected to the other pair of "complementary" or "conjugate" openings of hybrid filter 13.

Figure 1D:
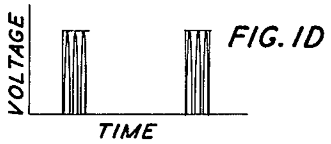

The frequency-modulated pulses shown in Fig. 1C pass through the dispersive circuit which comprises hybrid junction 13 and wave guides 14 and 15. The pulses are thereby shortened in length and increased in peak power, as illustrated in Fig. 1D. If the delay is near the optimum, the frequency modulation of the carrier is substantially eliminated and the pulses are transmitted normally.

From the above description of a practical embodiment, it is evident that the present invention enables alternating-current pulses to be transmitted at a greater amplitude than would otherwise be possible with the same oscillator. In the illustrated radar system, the effectiveness of the system is increased in relation to the increase in the amplitude of the transmitted pulses. Should the added amplitude not be desired for a particular application, a smaller, and cheaper, oscillator with less power-handling capacity may be employed.

In a variation of the radar system shown in Fig. 1, the dispersive circuit comprising hybrid junction 13 and wave guides 14 and 15 may be removed from the line between magnetrons output connection 12 and antenna guide 17 and inserted in the receiver circuit. Frequency modulated pulses are thereby transmitted from the radar antenna. Echo pulses returning from a target are similarly frequency modulated and the dispersive circuit is included in the receiver circuit to peak them. Possible breakdown of insulation due to excessive voltage in the antenna feed line is thereby prevented.

Some of the principles underlying the invention may be applied also to increasing effectively the output power available from a pulse-type communications system. Examples of such systems are pulse code modulation (PCM) and pulse position modulation (PPM) systems. In such systems, it would be desirable to increase the total output power beyond the capacity of a single oscillator by using a number of transmitting oscillators. At microwave frequencies it is very difficult if not actually impracticable to operate oscillators directly in parallel because of phasing or synchronizing difficulties. Thus, the output power can not readily be increased by using a number of oscillator tubes so connected. The system described here yields a similar increase in power without the synchronization problem.

When a single oscillator is used in a PCM or PPM system, the oscillator is successively triggered by a series of video or base-band direct-current control pulses. Neither the control pulses nor the alternating-current output pulses may overlap and the output power of the system, for a given pulse length and a given pulse separation, is limited by the amplitude of the output pulses produced by the oscillator. In the system herein described, a number of oscillators (four, for example) are used in rotation. When four oscillators are employed, each alternating-current pulse can be aproximately four times as long as those produced by a single oscillator system. They are generated at the same amplitude and energy per pulse is therefore correspondingly increased. Pulse shortening and peaking techniques, in accordance with the present invention, are then employed and the pulses are combined into a single series. The single series of pulses is then identical with that produced by a single oscillator system, except that the pulses are increased in amplitude and power.

Fig. 3A shows a series of direct-current control pulses which have been separated, by appropriate distribution means, into four separate channels. In the present pulse modulation system, the control pulses are stretched by appropriate well-known circuit means, such as, for example, that shown in Fig. 4. These pulses are stretched to such a length that they occupy substantially all the time interval between the start of one pulse and the start of the next one in that channel. Each channel is provided with its own individual oscillator, which generates a frequency-modulated pulse when triggered by the stretched direct-current control pulses of Fig. 3B.

The resulting long, frequency-modulated, alternating-current pulses are represented in Fig. 3C, rectangular pulses again being shown for simplicity. These individual pulses are passed through appropriate dispersive networks, which shorten the pulses until they no longer overlap and, at the same time, increase the peak power of each pulse and eliminate the frequency modulation, as shown in Fig. 3D. The pulses of the different channels in Fig. 3D can then be combined into a single series for transmission.

In the conventional pulse modulation system, the direct-current pulses of Fig. 3A remain a single channel and successively trigger a single oscillator. The resulting carrier frequency pulses are like those of Fig. 3D, combined into a single channel, except that they have less amplitude. It can be seen, therefore, that the process described above gives output pulses which are significantly greater in amplitude than those produced by a comparable conventional system. The amount of amplitude increase is, in general, directly related to the number of additional oscillator channels employed.

A system of the kind described in general terms above is indicated in Fig. 3, four oscillator circuits being shown by way of illustration. A series of direct-current control pulses may, for example, be generated in the video or base-band part of the PCM system described in an article by L. A. Meacham and E. Peterson entitled "An Experimental Multichannel Pulse Code Modulation System of Toll Quality," appearing in the Bell System Technical Journal, vol. 27, No. 1, page 1, January, 1948. These control pulses, corresponding to those shown in Fig. 3A before distribution into the four channels, are supplied over an input line 21 to an electronic distribution circuit 22, which routes the control pulses to the respective oscillator circuits in rotation, in the manner shown in Fig. 3A. The distributor may be similar to the means used in PCM or other time division multiplex systems to switch signals, in rotation, to different telephone channels. For examples, see pages 16 and 24 of the above PCM reference by Meacham and Peterson.

After being routed by distributor 22, the control pulses are stretched to the order of the pulse length of the long frequency-modulated pulses which are to be generated by the oscillators. For this purpose, the output side of distributor 22 is connected to pulse stretching circuits 23 in each of the four channels. Stretching may, if desired, be done as described in connection with Fig. 3A on page 17 of the above PCM reference by Meacham and Peterson, where pulses are stretched after being gated in a "pulse regenerator." An alternative is the transmission line circuit of Fig. 4, which will be described later. The nature of the pulses produced by pulse stretching circuits 23 is shown in Fig. 3B.

The stretched pulses are applied to the anode terminals 24 of the oscillators 25, which may be of the reflex or klystron type described in a paper by J. R. Pierce and W. G. Shepherd entitled "Reflex Oscillators," which appeared in the Bell System Technical Journal, vol. 26, No. 3, page 460, July 1947. The cathode terminals 26 of the oscillators 25 are grounded, as is one side of each pulse stretcher 23 and distribution circuit 22.

The pulse type anode voltages, as shown in Fig. 3B, cause the oscillator 25 to produce similar pulses of alternating current. The frequency is varied, during each pulse, by varying the voltage on the "repeller" electrode terminal 27 of the oscillator 25. This voltage variation is produced by pulse shaping circuit 28 connected in each channel between the oscillator repeller terminal 27 and the input side of the pulse stretcher 23.

If desired, the pulse shaping circuit 28 could generate a "saw tooth" voltage wave as for a cathode-ray oscilloscope, synchronized to the anode pulses by the same pulses that operate distributor 22. A possible pulse shaping circuit is shown on page 2-21 of Principles of Radar (second edition) by the Massachusetts Institute of Technology Radar School Staff, McGraw-Hill, New York, 1946. The "saw tooth" voltage can be superimposed on a constant bias to obtain any desired percentage variation in net voltage. An alternative means for obtaining a varying repeller voltage is the modified transmission line circuit of Fig. 5, which will be described later.

The alternating-current pulses generated by reflex oscillator 25 are frequency modulated, as shown in Fig. 3C. They are substantially equal in length to the stretched direct-current pulses applied to the oscillator anode terminals 24, and are nearly four times as long as the original direct-current control pulses. Because the oscillators 25 are used in rotation, the pulse length can be longer than permissible with a single oscillator by a factor equal to the number of units used in rotation. Each of the long carrier frequency pulses is generated at the normal level of power (the maximum level, for example) for the individual oscillator and, as a result, the pulses are generated with a total power greater than that obtainable from a single oscillator.

The output circuit of each oscillator 25 is connected by a wave guide 29 to a dispersive network 30, which may be similar to that described in connection with the radar system shown in Fig. 1. As the pulses shown in Fig. 3B pass through dispersive circuit 30, they are shortened and peaked, as indicated in Fig. 3D. The short, peaked pulses are carried from dispersive circuit 30 through a wave guide 31 to an optional pulse shaping filter 32, which may be employed to restore the pulses to any desired shape. The output side of each filter 32 is connected through wave guide 33 to an electronic alternating-current pulse collecting circuit 34, which combines the pulses of Fig. 3D into a single series. Pulses from input line 21 are supplied to collecting circuit 34 by way of a separate lead 35, thereby synchronizing collector 34 with distributor 21. An output valve guide 36 carries the output pulses to an external transmission circuit.

As an alternative to the arrangement shown in Fig. 3, the long frequency-modulated pulses generated by oscillators 25 may be fed directly into collector 34. With such an arrangement, the frequency-modulated pulses would, when combined into a single series, overlap. A dispersive circuit connected to the output side of collector 34 will then shorten and peak the pulses, thereby separating them from one another.

Figure 4:
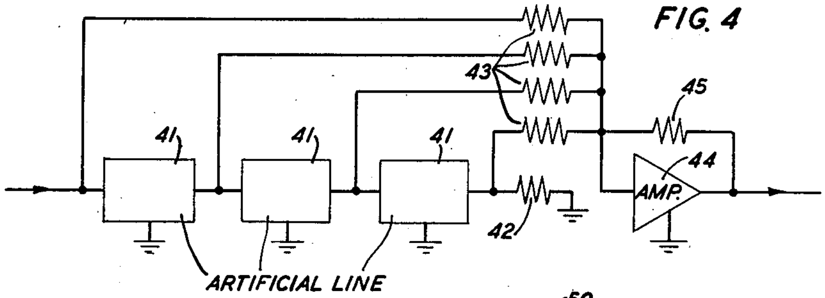
Fig. 4 represents a direct-current pulse stretcher suitable for use as a component of the system of Fig. 3.

Pulse stretcher 23 of Fig. 3 may, if desired, take the form of the circuit of Fig. 4. In Fig. 4, unstretched pulses are successively applied to a number, three, for example, of sections of transmission line or artificial line 41. One side of each of these sections 41 is grounded and a terminating resistance 42, matching the line impedances, is connected across the last section. A separate resistance 43, large in comparison with the line impedance, is connected to the ungrounded input terminal of each artificial line section 41. Another resistance 43, similar to the others, is connected to the ungrounded side of terminating resistance 42. The other sides of the resistances 43 are joined together and connected to the ungrounded input terminal of a direct-current amplifier 44. A feedback resistor 45 is connected between the ungrounded output and input terminals of amplifier 44, causing it to have a low effective input impedance.

The transmission line circuit shown in Fig. 4 repeats the original unstretched pulse several times in succession, the total length of the stretched pulse being determined by the number of artificial line sections 41. An example of a direct-current amplifier having several inputs and a feedback resistor is disclosed in K. D. Swartzel Patent 2,401,779, dated June 11, 1946.

Pulse shaper 28 of Fig. 3 may take the form of the circuit shown in Fig. 5. The circuit of Fig. 5 is similar to that of the pulse stretcher shown in Fig. 4. A number of sections of artificial line 46 correspond to the line sections 41 of Fig. 4. A terminating resistor 47 is similar to resistor 42 and an amplifier 48 and a feedback resistance 49 correspond to amplifier 44 and resistance 45. However, instead of employing a number of like resistors 43, the circuit of Fig. 5 makes use of resistors 50, 51, 52, and 53 which have different values of resistance. For example, resistor 51, connected to the input side of the second line section 46, may be larger than resistor 50, connected to the input side of the first line section 46. Resistor 52, connected to the input side of the third line section 46, may be larger than resistor 51, and so on.

The circuit of Fig. 5 repeats the direct-current control pulses several times but at different amplitudes. A more or less "stepped" type of lengthened pulse is produced, as indicated in Fig. 5A. The "stepped" pulse, however, is equivalent to an evenly sloped pulse, as shown in Fig. 5B, with superimposed high frequency ripples of the type shown in Fig. 5C. The size of the ripples will depend upon the "squareness" of the control pulses and can be reduced by means of a high frequency filter or shaping circuit located between the output side of amplifier 48 and repeller terminal 27 of oscillator 25.

The pulses produced by the Fig. 5 circuit have a voltage which decreases with time. If such pulses are employed, the carrier frequency will be reduced with time in the course of each alternating-current pulse. The dispersive circuits 30 in Fig. 3 should then be designed to delay high frequencies more than low frequencies in order for pulse shortening to take place. The Fig. 5 pulse shaper can, however, be adapted to produce pulses the voltage of which increases with time if the resistor 50 is made larger than resistor 51, and resistor 51 larger than resistor 52, and so on.

Instead of connecting the outputs of the various oscillations 23 of Fig. 3 directly in parallel, a collector such as that shown in Fig. 6 may be employed. The application of C. C. Cutler, Serial No. 118,890, filed September 30, 1949 (United States Patent 2,652,541, issued September 15, 1953, discloses means for applying voltages to crystals in wave guides to vary the amplitudes of the waves transmitted along the wave guides. The crystals act like high impedances across the transmission line equivalents of the wave guides when influenced by video pulses from the PCM system, and like low impedance the rest of the time. Such a circuit is used in the collector shown in Fig. 6.

In Fig. 6, each wave guide 33 carrying shortened alternating-current pulses of the type shown in Fig. 3D, is connected to a crystal switch 56. A quarter wave section of wave guide 57 is connected to the other side of each crystal 56. Each wave guide 57 is connected to the main output wave guide 36 at individual junctions 58, which correspond to parallel connections of two-wire transmission lines. Junctions 58 are a half of a wave-length apart along wave guide 36, which is closed at one end 59 a quarter of a wavelength beyond the last junction 58. A low frequency two-wire transmission line equivalent of the junctions and the spacing used is shown in Fig. 7.

In Fig. 6, each crystal 56 is connected to a pulse controlled video switching circuit 60. Circuit 60 is supplied with video pulses from the PCM system by lead 35, and in turn supplies pulses to each crystal 56 in rotation. As a direct-current pulse is applied to each crystal 56, the crystal is changed from the equivalent of a low shunt resistance to a high shunt resistance.

When the shunt impedance across any wave guide 33 is very high, the corresponding oscillator can transmit past the impedance with little loss. At the same time, impedance in other lines are low and, because of the quarter wave spacing, represent merely high impedances across the transmission path of the pulse.

In the foregoing description, the video or baseband direct-current control pulses were described as coming from the video part of a pulse code modulation system. They might just as well have come, however, from a pulse position modulation system, or any similar system in which pulse amplitudes are not varied as part of the modulation scheme. Similarly, the various components such as reflex oscillator tubes may, if desired, be replaced by other components performing similar functions.

To recapitulate, in the system described in connection with Fig. 3, a succession of direct-current pulses are transformed, through the practice of the principles of the present invention, into a series of alternating-current pulses which are substantially greater in amplitude than corresponding alternating-current pulses produced from direct-current pulses by a conventional system would be. By distributing successive direct-current pulses into separate oscillator channels, the Fig. 3 system enables those pulses to be stretched so that they occupy a greater time interval than would be permissible if all pulses remained in a single channel. The direct-current pulses in each channel are then stretched and used to trigger a separate carrier frequency oscillator. The frequency of the resulting oscillations is varied or modulated in a predetermined manner in the course of each pulse and the frequency modulated pulses are, in each channel, impressed upon a dispersive network which delays the leading end of the pulse more than the trailing end. The pulses are thereby shortened and increased in amplitude and are then combined, by a collector circuit, into a single non-overlapping series.

A pulse modulation transmitter utilizing the principles of the present invention reduces, because of the increased amplitude at which pulses are transmitted, the normal requirements for booster amplifier stages along the line over which intelligence may be sent. The individual pulses, because of their greater amplitude, are also more distinct from any background effects which may be on the line, thus giving a reduced possibility of error.

Some of the principles underlying the invention may be applied also to increase the peak power-handling capacity of pulse amplifiers. If, for example, the oscillators 25 of Fig. 3 were replaced by power amplifiers, then a greater total power would be available than would be available from a single power amplifier. The system using power amplifiers can be used for pulse amplitude modulation (PAM) systems, as well as for PCM and PPM systems. The use of power amplifiers is indicated in the PAM application described below. It should be remembered, however, that it is also suitable for PCM, PPM, or other time division pulse type systems.

In pulse amplifiers the power output problem is much the same as it is in pulse oscillators. Peak power is limited by the characteristics of the individual amplifier unless special techniques (i. e., those of the present invention) are used. In accordance with the principles of the present invention, an incoming series of carrier frequency pulses are distributed into a number of channels (four, for example) to allow space for pulse stretching. In each channel, the pulses are applied to a dispersive circuit of such characteristics that the output pulses are longer and are, in effect, frequency modulated. The action of these dispersive circuits will be explained in more detail later.

The lengthened frequency modulated pulses in each channel are then applied to individual amplifiers. The amplified pulses, still frequency modulated, are in turn applied to respective inverse dispersive circuits which shorten them and eliminate the frequency modulation. The output pulses, which may then be combined into a single series, are increased in amplitude by the conservation of energy effect noted previously and are substantially greater in amplitude than the same series of pulses would be if they had merely been passed through a single amplifier in the conventional manner.

Fig. 8 indicates a practical application of the principles of the invention to a radio frequency power amplifier arrangement for a PAM system. In Fig. 8, an input wave guide 66 is connected to a distribution circuit 67. A section of wave guide 68 is tapped into wave guide 66 and is connected to a distributor control circuit 69. A lead 70 connects control circuit 69 with distributor 67.

Distribution circuit 67 is connected by a number of wave guides 71 (four, for example) to a corresponding number of dispersive circuits 72. The output side of each dispersive circuit 72 is connected by a wave guide 73 to the input side of a power amplifier 74. The output side of each power amplifier 74, is, in turn, connected by a section of wave guide 75 to a dispersive circuit 76, and each dispersive circuit 76 is joined by a wave guide 77 to a collector circuit 78. Circuit 78 is connected to an external transmission circuit by an output wave guide 79.

Alternating-current pulses, similar in nature to those shown in Fig. 3D, but in a single channel and at lower amplitude, are carried by input guide 66 and then switched to a number of channels in rotation in a way analogous to the switching of the video pulses in Fig. 3. Distribution circuit 67 may be similar to that shown in Fig. 6, with crystals used as switches. Direct-current pulses for operating the switching circuit are obtained by rectifying and amplifying the alternating-current pulses and limiting them to obtain fixed amplitudes by means of control circuit 69.

Relatively long frequency modulated pulses are obtained from the input pulses by means of passive circuits 72 which produce dispersion. Since sharply rising pulses of alternating current contain many high frequency components, dispersion will both lengthen and frequency modulate such pulses. The higher frequencies are passed with less envelope delay than the lower frequencies, giving stretched alternating-current pulses similar to those shown in Fig. 3C.

The dispersive circuits 72 may be similar to the one in the output of the system described in connection with Fig. 1. The dispersive circuits 76 in the outputs of the power amplifiers 74 are like dispersive circuits 72, except that they are designed to produce a complementary effect. In other words, the input pulses are lengthened and frequency modulated by envelope delay distortion, and are then shortened again and increased in peak power, after amplification, by envelope delay equalization, the result being peak powers beyond the capabilities of the amplifiers alone. The shortened and peaked pulses produced by dispersive networks 76 are similar to those shown in Fig. 3D. Since only envelope delay distortion is used, the dispersive circuits 72 and 76 do not absorb power beyond the usual losses due to parasitic resistances. After the alternating-current pulses are shortened, they are combined through collector circuit 78, which may be similar to that shown in Fig. 6.

It should be noted that it is not required that the long carrier frequency pulses be shortened before being combined by collector 78 into a single series. A dispersive circuit located on the output side of collector 78 will have the effect of shortening and peaking the pulses, thereby separating them even if they had previously overlapped.

The power amplifiers 74 of Fig. 8 which amplify the lengthened pulses may be, for example, of the traveling wave type described in a paper by J. R. Pierce and L. M. Field entitled "Traveling-Wave Tubes," appearing in the Proceedings of the Institute of Radio Engineers, vol. 35, No. 2, page 108, February 1947.

As has been previously indicated, the principles of the present invention enable the peak power limitations of a single pulse amplifier to be overcome without presenting the additional difficulties of parallel operation. As was suggested previously in connection with the pulse oscillation system of Fig. 3, the invention will permit amplifiers of less power-handling capacity to be used if increased peak powers are not desired.

A further application of the principles of the invention is to compensate for unavoidable dispersion such as that inherent in long wave guides. If a fixed frequency alternating-current pulse is transmitted over a long wave guide, it will be lengthened by dispersion. If a pulse is frequency modulated to match the dispersive characteristics of the guide, the stretching will be reduced or may even be replaced by a contraction in length. For example, the usual long wave guide transmits lower frequency signals at a lower group velocity than it does those at higher frequency. If, then, an alternating-current pulse is frequency modulated so that its trailing end is at a slightly higher frequency than its leading end, the stretching tendency of the guide will be counteracted.

If increase in transmitter power is not of interest, but only compensation for dispersion inherent in a transmission system, the circuit of Fig. 3 may be replaced by the relatively simple circuit of Fig. 9. A single oscillator may be used and the distributing and pulse stretching circuits 23 of Fig. 3 may be omitted entirely. The oscillator generates pulses of normal length, but which are frequency modulated. The dispersive networks of Fig. 3 are replaced by the unavoidable dispersion effects of the transmission system.

In Fig. 9, video frequency direct-current pulses from a pulse modulation system are supplied to the input line 21, one side of which is connected to the anode terminal 24 of reflex oscillator 25. The other side of line 21 and the cathode terminal 26 are grounded. A pulse shaping circuit 81 is connected between the ungrounded side of line 21 and the repeller terminal 27 of oscillator 25. Pulse shaping circuit 81 may comprise a "saw-tooth" voltage generator of the type described in connection with Fig. 3. In the alternative, the circuit of Fig. 5 may be used if it is preceded by a circuit which produces shortened direct-current pulses from the input video or base-band pulses. However, in any event, the pulses applied to repeller electrode terminal 27 are such that the frequency of the generated current increases during the life of each pulse.

The output of oscillator 25 is connected by a section of wave guide 29 to an optional pulse shaping filter 32, which may be used to give the pulses any desired shape. The output side of filter 32 is connected to a long wave guide 82, the far end of which is connected to a receiver 83.

The circuit of Fig. 9 operates in a manner similar to an individual channel of Fig. 3. Oscillator 25 generates frequency modulated alternating-current pulses when triggered by the input control pulses. In Fig. 9, however, the video or base-band control pulses and the pulses generated by oscillator 25 are of normal length, since there is no need to produce an increase in power by way of a pulse stretching operation.

The frequency modulation of the alternating-current pulses generated by the reflex oscillator 25 should be chosen to fit the dispersion of the long wave guide 82. In general, as has already been pointed out, a long wave guide transmits waves having a high frequency at a higher group velocity than those having low frequency. The carrier of the pulses generated by oscillator 25 should therefore increase in frequency with time, with the rate of increase chosen to match the delay characteristics of the long wave guide 82.

In the case of a long system from which signals may be taken off at any of several points, compensation may be for the greatest length of wave guide. In that event, if the compensation is so fixed that the pulses appearing at the end of the line are equal in length to the input pulses, the pulses taken off at intermediate points will be somewhat shorter than the input pulses.

The embodiment of the invention shown in Fig. 9 possesses the advantage over the prior art of being able to compensate for unavoidable dispersion in a transmission system, while that shown in Fig. 3 possesses the advantage of being able to yield output pulses of increased peak power. The two may be combined advantageously in many instances. A combination of this sort is indicated in Fig. 10, where output wave guide 36 of Fig. 3 is connected to the input end of long wave guide 82 of Fig. 9. The amounts of frequency modulation and dispersion used in the Fig. 3 circuit are so chosen that pulses of the desired length are obtained at output guide 36 without entirely eliminating the frequency modulation, the remaining modulation being retained for compensation for wave-guide distortion in the line 82. The pulses reaching receiver 83 are similar to those shown in Fig. 3D, except that they have been combined into a single series.

An example showing the order of magnitude of frequency modulation which might be required to obtain substantial shortening and peaking of pulses may be calculated. In the following example, a long wave guide of circular cross-section is used to give dispersive effects and a Gaussian pulse shape, which closely approximates the shape of practical pulses, is employed for ease of calculation. The Gaussian pulse shape is defined by $$e^{-\frac{4(t-t_1)^2}{T^2}} \quad (1)$$

where $e$ is the base of the natural or Napierian system of logarithms, $t$ is a variable representing time, $t_1$ is the time at which the leading end (one-neper point) of the pulse appears, and T represents the pulse length in units of time (measured between one-neper points). The calculated data appear in the following table:

| | |
|---|---|
| Wave-guide diameter | 2 inches |
| Wave-guide length | 25 miles |
| Mean carrier frequency | 50,000 megacycles |
| Minimum received pulse length at a fixed carrier frequency | .0085 microsecond |
| Input pulse length | .05 microsecond |
| Received pulse length | .00146 microsecond |
| Gain due to peaking effect | 15 decibels |
| Frequency swing between four neper points: | |
| Input pulse | +11,000 megacycles in .1 microsecond |
| Received pulse | −300 megacycles in .003 microsecond. |

As indicated in the above table, there is, in the absence of frequency modulation, a minimum length for a pulse of a given shape received at the end of the guide, regardless of how short the input pulse may be. The principles of the present invention enable a relatively long pulse to be received at a length considerably shorter than the minimum. In addition, aside from attenuation, the received pulse is at a considerably higher peak power than the transmitted pulse in the above example, whereas peak power would be substantially reduced if a fixed carrier frequency were used.

It is of interest to note that too short an input pulse will give an unnecessarily long received pulse when the dispersion in the wave guide is substantial. It can be shown that for a particular pulse shape there is an optimum input pulse length from the standpoint of pulse shortening. For the Gaussian pulse shape, the minimum length for a received pulse can be shown to be $$\frac{2}{\sqrt{\pi}}T_c \quad (2)$$

where $$T_c = 2\omega_0\sqrt{\frac{\pi L}{c}}(\omega^2-\omega_0^2)^{-\frac{3}{4}} \quad (3)$$

In the above relationship, $\omega_0$ is equal to $2\pi$ times the cut-off frequency of the wave guide, $\omega$ is equal to $2\pi$ times the mean carrier frequency, $L$ is the length of the wave guide, and $c$ is the velocity of light. The input pulse length which will yield a pulse of the minimum length can be shown, then, to be $$\sqrt{\frac{2}{\pi}}T_c \quad (4)$$

The principles of the present invention may also be applied to the counteraction of attenuation which may be inherent in a dispersive pulse transmission system. For example, in Figs. 9 and 10, pulses transmitted over long wave guide 82 will very likely be greatly attenuated if they are not frequency modulated in accordance with the invention. However, in the systems shown in Figs. 9 and 10, such pulses are frequency modulated in such a manner that wave guide 82 transmits their trailing portions faster than their leading portions. If the amount of carrier frequency swing is properly chosen, the amplitude of the received pulses will tend to be substantially the same as the transmitted pulses, much of the power loss due to attenuation being observed in the decrease in length of the received pulses. The required amount of frequency modulation is determined largely by the amount of attenuation and by the dispersive characteristics of wave guide 82.

It is to be understood that the above-described arrangements are illustrative of the application of the principles of the invention. Particular items of equipment have been specified only by way of example and particular pulse shapes have been illustrated and described for convenience only. Numerous other arrangements may be devised by those skilled in the art without departing from the spirit and scope of the invention.

What is claimed is:

1. A pulse transmitter which comprises, in combination, a source of pulses of alternating current, means coupled to said source for varying the frequency of the alternating current progressively from a first frequency at the leading end of each pulse to a second frequency at the trailing end of each pulse, and a dispersive circuit in tandem transmission relation with said source, said dispersive circuit having a first alternating-current wave energy transmission time at said first frequency and a second alternating-current wave energy transmission time at said second frequency, the difference between said second energy transmission time and said first energy transmission time being at least several times the length of each output pulse.

2. A pulse transmitter in accordance with claim 1 in which said first frequency is lower than said second frequency and the group velocity of wave transmission of said dispersive circuit increases with frequency.

3. A pulse transmitter in accordance with claim 1 in which said first frequency is higher than second frequency and the group velocity of wave transmission of said dispersive circuit decreases with frequency.

4. A pulse transmitter which comprises, in combination, a source of pulses of alternating current, means coupled to said source for varying the frequency of the alternating current progressively from a first frequency at the leading end of each pulse to a second frequency at the trailing end of each pulse, and means for converting the relatively long low-amplitude pulses of frequency-modulated alternating current into relatively short high-amplitude output pulses of substantially constant frequency alternating current comprising a dispersive circuit in tandem transmission relation with said source, said dispersive circuit having a first alternating-current wave energy transmission time at said first frequency and a second alternating-current wave energy transmission time at said second frequency, the difference between said second energy transmission time and said first energy transmission time being at least several times the length of each output pulse.

5. A pulse transmitter in accordance with claim 4 in which said first frequency is lower than said second frequency and the group velocity of wave transmission of said dispersive circuit increases progressively with frequency.

6. A pulse transmitter in accordance with claim 4 in which said first frequency is higher than said second frequency and the group velocity of wave transmission of said dispersive circuit decreases progressively with frequency.

7. A pulse signalling system comprising at one end of said system a transmitter which includes a source of pulses of alternating current, means coupled to said source for varying the frequency of the alternating current progressively from a first frequency at the leading end of each pulse to a second frequency at the trailing end of each pulse, and a dispersive circuit in tandem transmission relation with said source, said dispersive circuit having a first alternating-current wave energy transmission time at said first frequency and a second alternating-current wave energy transmission time at said second frequency, the difference between said second energy transmission time and said first energy transmission time being substantially one pulse length, and at the other end of said system a signal receiver to receive pulse energy emanating from said transmitter.

8. A pulse signalling system comprising at one end of said system a transmitter which includes a source of pulses of alternating current, means coupled to said source for varying the frequency of the alternating current progressively from a first frequency at the leading end of each pulse to a second frequency at the trailing end of each pulse, and means for converting the relatively long low-amplitude pulses of frequency-modulated alternating current into relatively short high-amplitude output pulses of substantially constant frequency alternating current comprising a dispersive circuit in tandem transmission relation with said source, said dispersive circuit having a first alternating-current wave energy transmission time at said first frequency and a second alternating-current wave energy transmission time at said second frequency, said first energy transmission time exceeding said second energy transmission time by at least several times the length of each output pulse, and at the other end of said system a signal receiver to receive pulse energy emanating from said transmitter.

9. A pulse signaling system which comprises a source of pulses of alternating current, means coupled to said source for varying the frequency of the alternating current progressively from a first frequency at the leading end of each pulse to a second frequency at the trailing end of each pulse, means to shorten and peak the frequency-modulated alternating current pulses including a dispersive circuit coupled to said source, said dispersive circuit having a first alternating-current wave energy transmission time at said first frequency and a second alternating-current wave energy transmission time at said second frequency, said first energy transmission time exceeding said second energy transmission time by at least several times the length of each peaked pulse, pulse radiating means connected to receive peaked pulses from said dispersive circuit, pulse receiving means connected to receive pulse energy radiated by said pulse radiating means, and pulse utilization means connected in tandem transmission relation with said pulse receiving means.

10. A system for amplifying pulses of alternating current without exceeding the peak power limitations of the amplifier which comprises, in tandem transmission relation, a first dispersive circuit having a group velocity of wave transmission which varies progressively with frequency in one direction, an amplifier, and a second dispersive circuit having a group velocity of wave transmission which varies progressively with frequency in the opposite direction.

11. A system for amplifying pulses of alternating current without exceeding the peak power limitations of the amplifier which comprises, in tandem transmission relation, a first dispersive circuit having a group velocity of wave transmission which increases progressively with frequency, whereby each pulse is lengthened and reduced in amplitude, an amplifier, and a second dispersive circuit having a group velocity of wave transmission which decreases progressively with frequency, whereby each pulse is shortened and increased in amplitude.

12. A system for amplifying pulses of alternating current without exceeding the peak power limitations of the amplifier which comprises, in tandem transmission relation, a first dispersive circuit having a group velocity of wave transmission which decreases progressively with frequency, whereby each pulse is lengthened and reduced in amplitude, an amplifier, and a second dispersive circuit having a group velocity of wave transmission which increases progressively with frequency, whereby each pulse is shortened and increased in amplitude.

13. A pulse transmission system which comprises a wave amplifying device having input and output circuits and means to pass pulses of alternating current through said device without exceeding its peak power liimtations comprising a first dispersive device in said input circuit, said first dispersive device having an alternating-current wave energy transmission time which varies progressively with frequency in one direction and undergoes an increase of at least a pulse length during the life of each pulse, and a second dispersive device in said output circuit, said second dispersive device having an alternating-current wave energy transmission time which varies progressively with frequency in the opposite direction and undergoes a decrease of at least a pulse length during the life of each pulse.

14. A pulse transmission system which comprises a wave amplifying device having input and output circuits and means to pass pulses of alternating current through said device without exceeding its peak power limitations comprising means to extend each input pulse to at least several times its original length including a first dispersive device in said input circuit having a group velocity of wave transmission which varies progressively with frequency in one direction, and means to restore each pulse to substantially its original length including a second dispersive device in said output circuit having a group velocity of wave transmission which varies progressively with frequency in the opposite direction.

15. A pulse transmission system in accordance with claim 14 in which the group velocity of wave transmission of said first dispersive device increases progressively with frequency and the group velocity of wave transmission of said second dispersive device decreases progressively with frequency.

16. A pulse transmission system in accordance with claim 14 in which the group velocity of wave transmission of said first dispersive device decreases progressively with frequency and the group velocity of wave transmission of said second dispersive device increases progressively with frequency.

17. A pulse-type communication system which comprises a source of direct-current control pulses; a plurality of signal channels each of which includes means to increase the time duration of direct-current pulses by a factor corresponding to the number of channels, an oscillator to generate pulses of alternating current under the control of the lengthened direct-current control pulses, means coupled to said oscillator to vary the frequency of the generated oscillations progressively from a first frequency at the leading end of each pulse to a second frequency at the trailing end of each pulse, and a dispersive circuit in tandem transmission relation with said oscillator, said dispersive circuit having a first alternating-current wave energy transmission time at said first frequency and a second alternating-current wave energy transmission time at said second frequency, the difference between said second energy transmission time and said first energy transmission time being at least a major portion of a pulse length; a distributor for switching successive direct-current control pulses to said signal channels in rotation; and a collector for combining the alternating current pulses from said channels into a single succession of pulses.

18. A pulse-type communication system which comprises a source of pulses of alternating current; a plurality of signal channels each of which includes, in tandem transmission relation, means to lengthen each input pulse by a factor corresponding to the number of channels including a first dispersive circuit having a group velocity of wave transmission which varies progressively with frequency in one direction, an amplifier, and means to restore each pulse to substantially its original length including a second dispersive circuit having a group velocity of wave transmission which varies progressively with frequency in the opposite direction; a distributor for switching successive alternating current pulses from said source to said signal channels in rotation; and a collector for combining the alternating current pulses from said channels into a single succession of pulses.

References Cited in the file of this patent

UNITED STATES PATENTS

| Number | Name | Date |
|---|---|---|
| 2,227,108 | Roosenstein | Dec. 31, 1940 |
| 2,401,619 | Trevor | June 4, 1946 |
| 2,402,184 | Samuel | June 18, 1946 |
| 2,407,644 | Benioff | Sept. 17, 1946 |
| 2,410,748 | Roberts | Nov. 5, 1946 |
| 2,423,644 | Evans | July 8, 1947 |
| 2,428,366 | Gilman | Oct. 7, 1947 |
| 2,433,804 | Wolff | Dec. 30, 1947 |
| 2,482,974 | Gordon | Sept. 27, 1949 |
| 2,502,531 | Morton et al. | Apr. 4, 1950 |
| 2,519,083 | Sutter et al. | Aug. 15, 1950 |
| 2,522,367 | Guanella | Sept. 12, 1950 |
| 2,525,328 | Wolff | Oct. 10, 1950 |

FOREIGN PATENTS

| Number | Country | Date |
|---|---|---|
| 604,429 | Great Britain | July 5, 1948 |